Figure 5:
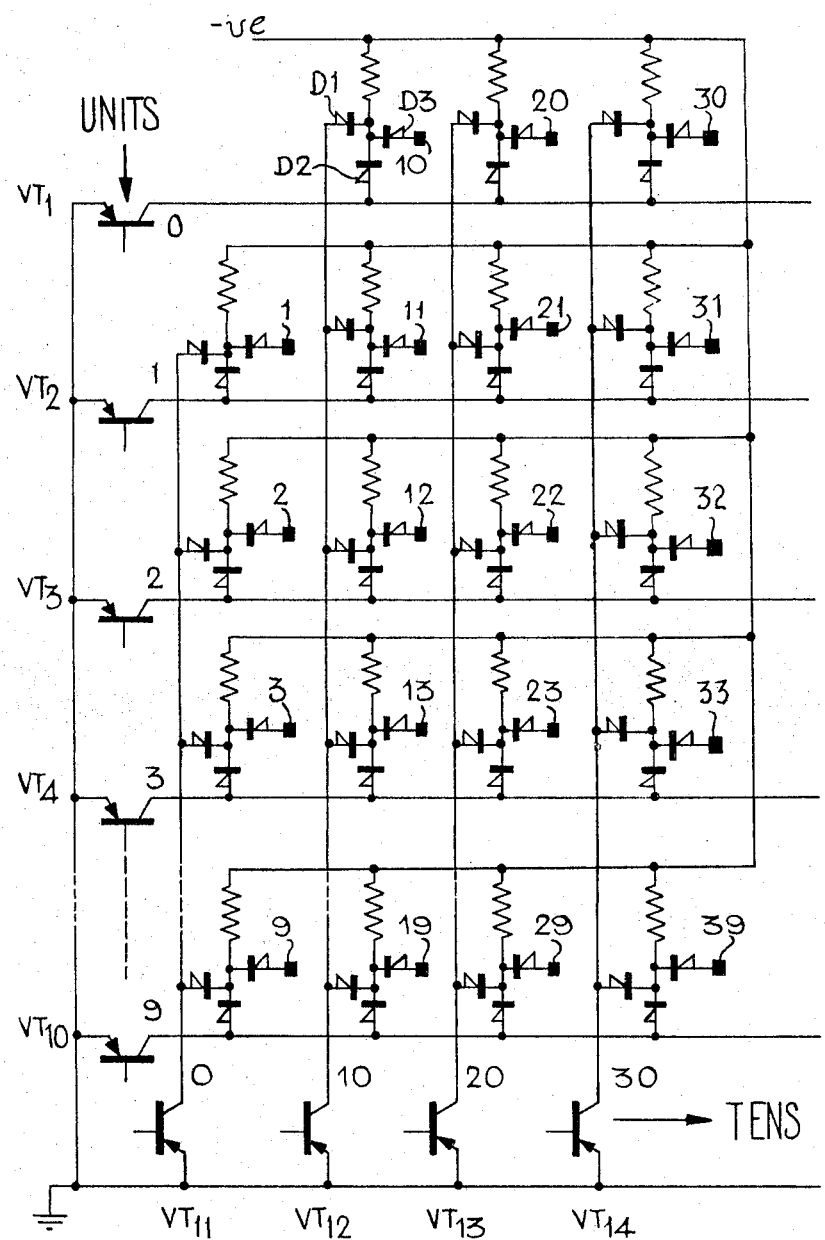

Nov. 15, 1966  G. T. OHLSEN ETAL  3,286,146
MOTOR CONTROL DEVICE FOR ATTAINING AN ANGULAR POSITION
Filed Nov. 26, 1963  4 Sheets-Sheet 1
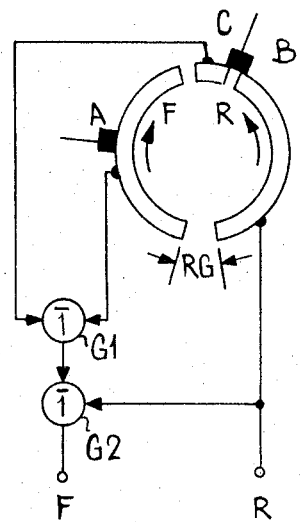
Fig. 1
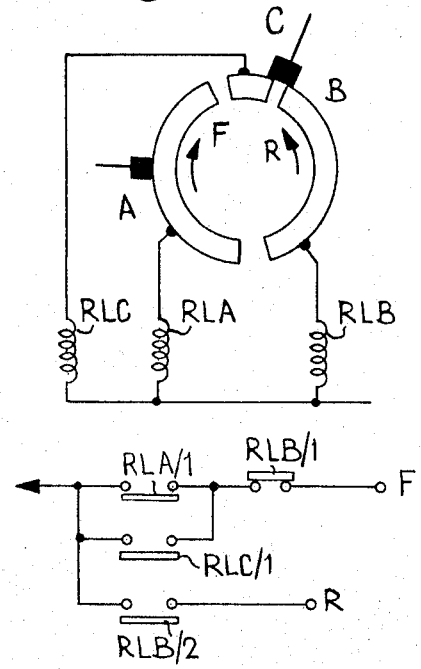
Fig. 2.
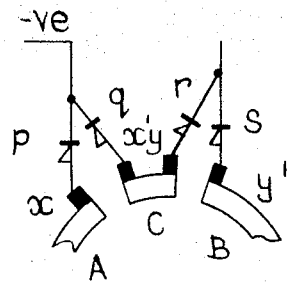
Fig. 3.
Fig. 4.

United States Patent Office 3,286,146
Patented Nov. 15, 1966

3,286,146
MOTOR CONTROL DEVICE FOR ATTAINING AN ANGULAR POSITION
Geoffrey Turner Ohlsen, Leicester, and Peter Lyford Smith, Oadby, England, assignors to Associated Electrical Industries Limited, London, England, a British company
Filed Nov. 26, 1963, Ser. No. 325,986
Claims priority, application Great Britain, Nov. 26, 1962, 44,637/62
8 Claims. (Cl. 318—31)

A form of automatic positioning control is known in the radio industry which enables the angular position of a shaft to be set to any one of a number of discrete positions. The controlled shaft carries a disc on which two arcuate conducting segments, insulated one from the other, are mounted on one face so as together to cover a full circle except for two diametrically opposed gaps. The required angular setting positions are represented by a series of brushes arranged round the periphery of the disc such that each brush represents one required angular setting and makes contact with one of the two segments. One segment is connected to circuits which cause the shaft and disc to be rotated in a clockwise direction by a driving motor while the other segment is connected to circuits which cause the motor to drive the shaft in an anticlockwise direction.

The shaft is set to a required position by energizing the appropriate brush which thus energizes the segment lying beneath it and causes the shaft to rotate until the brush loses contact with the segment on reaching the gap between the ends of the two segments, when the motor stops. This gap therefore acts as the reference position of the shaft. The remaining, diametrically opposite, gap is made just wide enough so that a brush cannot span the gap and cause both segments to be energized simultaneously.

The present invention includes, in one particular aspect thereof, an improvement on the above technique which enables the required setting positions to be placed in any desired position, including diametrically opposite positions. To enable this to be done, a third, short segment is placed between and spaced from the two main segments in the gap diametrically opposite the reference gap, the brushes being wide enough to span each, separately, of the spaces between the short third segment and the two main segments.

More generally an automatic angular positioning control apparatus according to the invention comprises a plurality of selectively excitable energising devices located at preselectible angular positions, two pick-up devices effective over respective arcs together covering a complete circle except for a reference gap and a diametrically opposed gap in the circle, a third pick-up device effective over an arc located in said diametrically opposed gap with isolation between it and the effective arcs of each of the other two pick-up devices, the energising device being effective over an arc less than each of said gaps but great enough to span the isolation between the effective arc of the third pick-up device and that of each of the other two pick-up devices, and control means for producing relative rotation between the pick-up devices and the energising devices in one direction in response to energisation of one of said first two pick-up devices by an excited energising device and in the opposite direction in response to such energisation of the other two pick-up devices separately or together.

Relating this generic aspect of the invention to the particular aspect already noted each brush in the latter constitutes an energising device, the two main arcuate segments constitute respective pick-up devices together covering a full circle apart from the reference and diametrically opposite gaps between them, and the third segment constitutes the third pick-up device isolated from the other two by the spaces between it and them in the diametrically opposite gap, the brush being wide enough to span each of these isolating spaces separately. Other modes of performing the invention, including one in which lamps and photo-electric cells are used instead of brushes and segments engaged thereby, will be described later.

Figure 6:
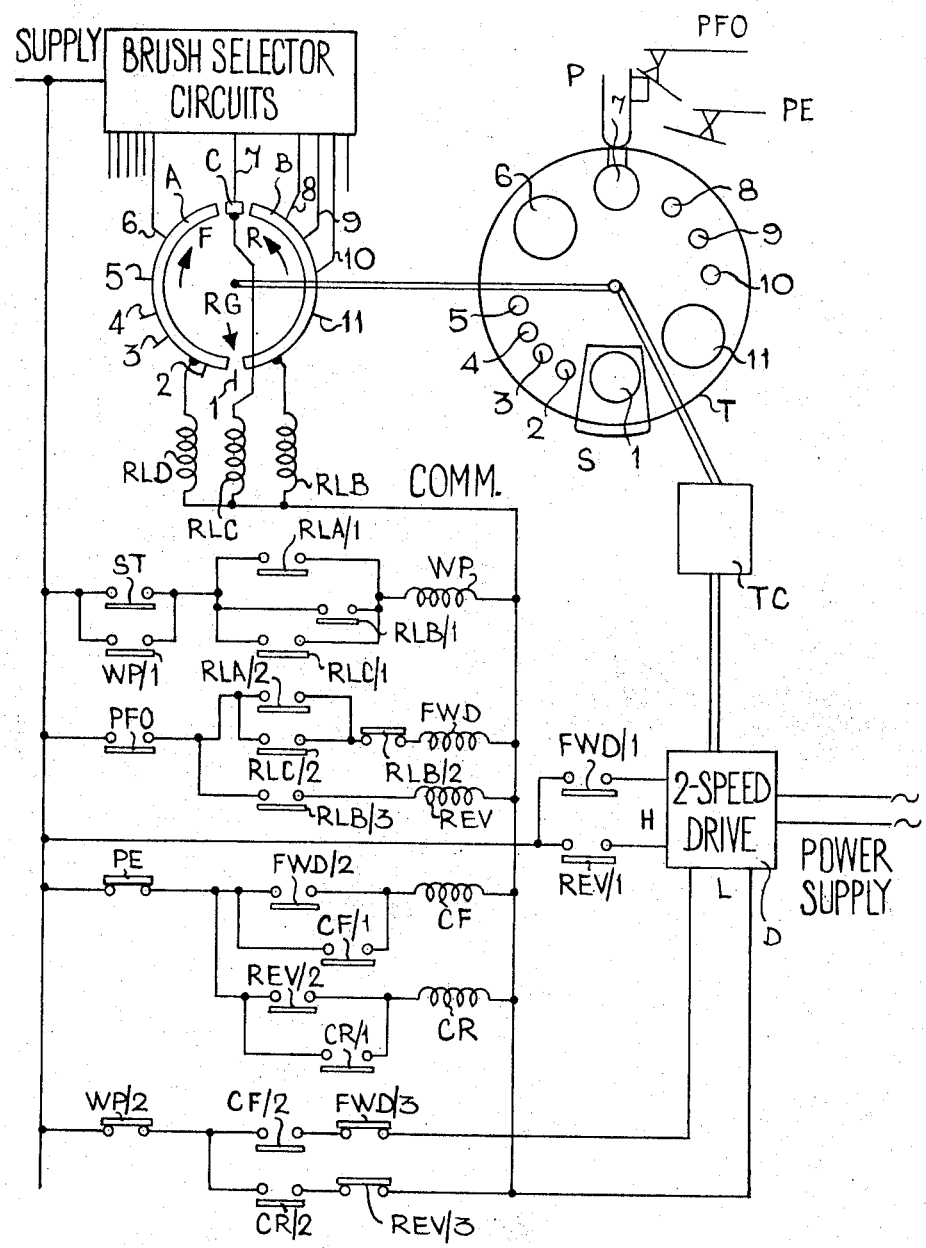
Figure 7:
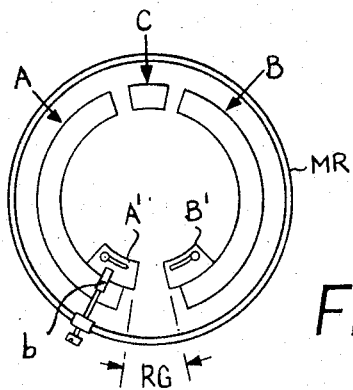
Figure 8:
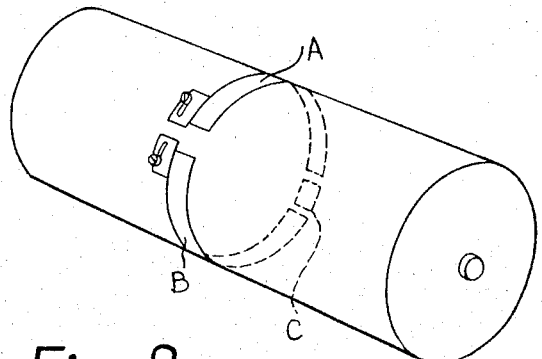
Figure 9:
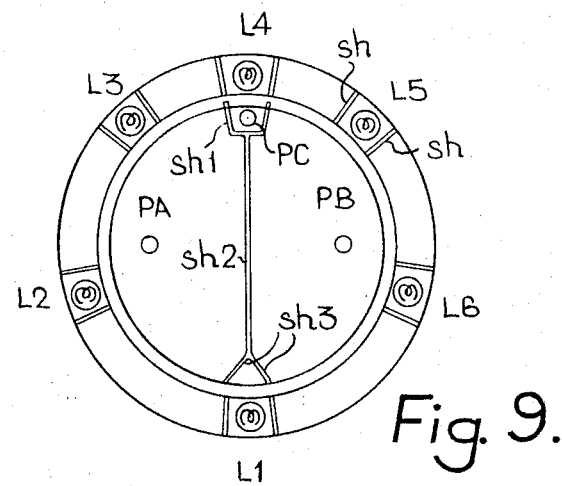

In further explaining the invention and various embodiments thereof reference will be made to the accompanying drawings in which, FIG. 1 illustrates the invention in its simplest aspect using brushes and conductive segments, FIG. 2 repeats FIG. 1 but shows a practical embodiment for parts shown in logical symbolism in FIG. 1, FIG. 3 illustrates a brush modification, FIG. 4 illustrates a brush arrangement, FIG. 5 illustrates a brush selector matrix, FIG. 6 illustrates the use of the invention in controlling the positioning of a machine tool turret, and FIGS. 7, 8 and 9 illustrate other modifications.

In FIG. 1, RG denotes the reference gap between the two main segments A and B, with the short third segment C positioned between the segments A and B diametrically opposite the gap RG. It is required that the disc shall rotate clockwise if any one of the brushes resting on segment A is energized and counter-clockwise if one of the brushes resting on B is energized. These directions are shown arrowed and will be termed forward (F) and reverse (R) for convenience. If the energized brush overlaps segments A and C, or engages segment A or segment C only, forward rotation is required; should it overlap segments B and C or engage segment B only, reverse rotation is required. This may be achieved by the use of logic circuits, for instance as shown in FIG. 1 where an energized brush resting on segment A or C, or on both simultaneously, causes the output of a NOR gate G1 to disappear and hence allows an output signal to be generated at the "forward" terminal F (that is, at the output of NOR gate G2). Should the energized brush rest on segment B or overlap B and C, an output signal appears at the reverse terminal R and also applies an input signal to G2, preventing any output from this gate.

An equivalent relay circuit is shown as an example in FIG. 2. Relays RLA, RLB, RLC are respectively connected to the three segments A, B and C, each so as to be energized when its segment is engaged by an energized brush. If the energized brush engages segment A or segment C or both of them it causes operation of relay RLA or RLC, or both of them, with consequent connection of the supply to the forward terminal F via relay contacts RLA/1 and/or RLC/1, normally closed contacts RLB/1 of relay RLB being unoperated. If the energized brush engages segment B, relay RLB is operated to connect the supply to the reverse terminal R via relay contacts RLB/2: if segment C is also engaged by the brush, operation of contacts RLB/1 prevents connection of the supply to the forward terminal F via contacts RLC/1.

The source of power will depend on the type of logic circuits or relays employed and may therefore be A.C. or D.C. as required. In the case of a D.C. supply, the brushes may be connected to either pole, depending on the logic or relay circuit requirements.

These simple arrangements place a restriction on the siting of the brushes in that it must never be possible for two brushes simultaneously to span the gaps bounding segment C, since this would cause all three segments to be energized simultaneously. Segment C would therefore normally be made shorter than the minimum spacing required between adjacent brush positions. The limitation can be removed, however, if each brush is replaced by two brushes which, individually, are narrower than the gaps bounding segment C and are spaced sufficiently far apart so that the pair can span the gap. These two brushes, which together constitute a composite device equivalent to the single brush which they replace are connected together via rectifiers as shown in FIG. 3. This circuit allows operation from a D.C. source with the active brush-pair returned to the negative side of the supply, or from an A.C. source using only half-wave operation.

If both gaps are spanned as shown in the figure and the brush-pair $x$, $x'$ is energized from the negative pole of a D.C. supply, then current can flow in segment A and C but not in segment B owing to the blocking effect of diode $r$. It is thus impossible for all of three segments to be energized simultaneously.

The invention has particular application to machine tools where it is required to position a rotary member to any one of a number of randomly-placed positions, such as a drum store for tools which are required to be automatically selected in a matching programme, or as a means of positioning the turret of a turret press or turret type drilling machine.

The selection of desired position may be by means of selector switches or punched card or tape.

Taking the case of a turret press, the siting of the punching stations around the turret may vary widely from one machine to another as regards the number of stations and their relative angular spacings. FIG. 4 shows control disc for a 24-station turret, the mounting for each brush, or brush-pair, being adjustable round a mounting ring MR. The disc would, in practice, be coupled 1:1 with the turret, which is not shown in this figure.

If the turret is to be controlled from punched tape, or a similar control medium utilising binary (two-state) storage, the control signals must first be decoded into decimal form. Binary-to-decimal decoders are well known and need not be described here. The decoded signals can be fed to a brush selector matrix as shown in FIG. 5. This circuit, which provides for selective energization of up to 39 brushes and can readily be expanded for a greater number if required, is suitable for D.C. control signals which are negative-going in the "1" state. The transistors are controlled on their bases from the output circuits of the decoding equipment, such that only the transistor in the relevant units column is cut off at any time and similarly for the tens row; all the other transistors remain bottomed. For example, if it is desired to position the turret to station 13, transistor VT4 will be cut off in the units column, and VT12 will be cut off in the tens rows. A negative signal will therefore only be available at brush 13, all other brushes being earthed. The diodes such as D1, D2 act as AND gates, whereby only the brush corresponding to the cut-off row and column is allowed to remain at a negative potential with respect to earth. The diodes such as D3 prevent the energized brush being earthed via the earthed brushes resting on the same segment. The upper ends of all the resistors are connected to the negative pole of the supply.

The invention may also be adapted in a simple manner to allow a slow final approach to the required position. The turret of a turret press or drilling machine normally employs some form of locating or locking plunger or plungers to hold the turret in precise alignment whilst drilling or punching. Interlock switches can be fitted to these plungers to indicate when the plungers are fully out of engagement and when they are fully engaged.

FIG. 6 shows one form of relay control circuit which will operate in this manner. The drive to a turret T having punching stations 1–11 comprises a 2-speed motor or motor plus 2-speed gearbox arrangement D driving through a torque limiting clutch TC. The positioning disc is driven with the turret in a 1:1 ratio and has brushes 1–11 positioned round it in accordance with the angular positions of the turret stations 1–11. The turret locking plunger P is arranged to locate in holes drilled in the side of the turret—in this case it is shown diametrically opposite the punching station S.

Assume that the brush selector circuits are set to demand that the turret align to station 7. Brush 7 is engaging segment C, requiring motion in the direction of arrow F. Relay RLC is energized via brush 7 and the selector circuits. When the initiating button ST is pressed, relay WP will energize via RLC/1 contacts and hold in via WP/1 contacts. This relay energizes a solenoid (not shown) which causes withdrawal of the plunger P. When the plunger P is fully disengaged, switch PFO closes, causing relay FWD to energize and select at contacts FWD/1 fast forward drive (H) to the turret. The relay FWD also causes the crawl forward relay CF to energize over contacts FWD/2. It holds in via its contacts CF/1 but crawl speed (L) is not selected by its contacts CF/2 since the selection circuit including these contacts is interrupted by WP/2 contact.

When brush 7 overlaps segments C and A relay RLA energizes. When the brush leaves segment C, relay RLC de-energizes, but relay FWD remains energized over contacts RLA/1. When the brush loses contact with segment A, RLA de-energizes, causing relay WP to de-energize and release the plungers, which now bear against the turret edge under spring pressure (or by other means); at the same time relay FWD de-energizes. The turret therefore decelerates to crawl speed since the circuit WP/2, CF/2, FWD/3 is now closed, demanding crawl forward.

When the turret locating hole is aligned with the plungers, the plungers engage in the holes and prevent further turret movement, while the torque limiting clutch slips until the drive is stopped when the plunger interlock switch PE is opened on full plunger engagement. PE causes relay CF to de-energize and stop the drive motor.

Instead of using the plungers to control the crawl speed, an additional short segment could be introduced in the reference gap. This segment would be so positioned that its bounding gaps were wider than a brush width. Loss of contact between the energized brush and segment A or B would still be arranged to demand crawl speed, but this would be terminated, and the turret stopped, when the brush contacted the additional segment.

It may be advantageous to make the disc in such a manner that the reference gap is adjustable, in order to make allowance for variations in friction and inertia from one type of application to another, which will affect the stopping distance from the point of loss of contact with segment A or B. This may be done by attaching a sliding segment section such as A', B' to either or both of the segments A and B, as shown in FIG. 7. The brushes (typified by brush $b$) would be made sufficiently wide, in a radial direction, to ensure that contact was maintained until the brush left the adjustable section. The adjustable sections would be electrically connected to their respective segments.

An alternative method of construction would be to replace the disc by a drum, as shown in FIG. 8. In both forms of construction (disc or drum) slip rings (not shown) will be necessary in order to connect to the segments if continuous rotation is required.

In place of the brush selection matrix of FIG. 5, the brushes could be arranged so that all brushes having the same least significant (units) digit value were commoned together, i.e. brushes 1, 11, 21, 31 etc., and brushes 2, 12, 22, 32 etc., and so on. In the de-energised state, all brushes would be lifted clear of the segments and each decade set of brushes such as 1 to 9, 10 to 19, 20 to 29 etc., would be independently controlled by an electromagnet controlled by the relevant (tens) digit. The magnet would cause its associated brushes to be brought into contact with the control disc or drum.

Hence, if position 29 were demanded, the control circuits would energise all brushes whose least significant (units) digit is 9, i.e. 9, 19, 29 etc., and the 20's magnet would be energised by the control circuits to bring the brushes 20 to 29 in contact with the control drum or disc. Thus only the correct energised brush would be brought into contact with the disc or drum.

As an alternative to brushes and segments, lamps and photo-electric cells effective over similar arcs could be used. Lamps such as L1 . . . L6, with shields $sh$ defining the arcs over which they are individually effective, would replace the brushes and only the lamp corresponding to the required station would be illuminated by the selector circuits. Three photo cells would replace the three segments in the manner shown in FIG. 9. The centre portion carries three cells, PA, PB and PC and is driven 1:1 by the turret. Cell PC is surrounded on three sides by a shield $sh1$ so that when cell PC is opposite an illuminated lamp, light can fall only on this and not on either of the other cells. Cells PA and PB are arranged on either side of a reflecting light shield $sh2$ such that any illuminated lamp lying to one side or the other of this shield, and not obscured by the ends $sh3$ of the shield, will energise the relevant cell.

The end portions $sh3$ of shield $sh2$ opposite cell PC, obscure the illuminated lamp from all cells when the disc is aligned to the desired position and hence act in the same way as the reference gap RG. The cell outputs are used to actuate relay or logic circuits of the same form as FIGS. 1 or 2. This arrangement could also be made in drum form rather than as a disc.

A further method of carrying out the invention would be to replace the brushes by small metal plates positioned just clear of the segments and parallel to the faces of the disc or drum. Change in capacitance between an energised plate and a segment could be used to detect an A.C. energising signal by the segment or to tune and detune oscillators connected to the three segments. Also, inductive methods could be used in which each brush is replaced by a small input winding; only one such winding being energised at a time. The segments would be replaced by an iron or ferrite core of similar shape and relative length. Each core would carry a secondary winding which would therefore detect an A.C. energised input winding, by transformer action. The output signals from the secondary windings could be used as before, for instance to drive a relay circuit of the type shown in FIG. 2.

What we claim is:

1. Automatic angular positioning control apparatus comprising a plurality of selectively excitable energising devices located at preselectible angular positions, two pick-up devices effective over respective arcs together covering a complete circle except for a reference gap and a diametrically opposed gap in the circle, a third pick-up device effective over an arc located in said diametrically opposed gap with isolation between it and the effective arcs of each of the other two pick-up devices, the energising device being effective over an arc less than each of said gaps but great enough to span the isolation between the effective arc of the third pick-up device and that of each of the other two pick-up devices, and control means for producing relative rotation between the pick-up devices and the energising devices in one direction in response to energisation of one of said first two pick-up devices by an excited energising device and in the opposite direction in response to such energisation of the other two pick-up devices separately or together.

2. Apparatus as claimed in claim 1 wherein each said energising device is compositely constituted by a pair of individual devices angularly spaced to jointly span the effective arc of the replaced energising device but each effective over an arc less than that covered by said isolation between the third pick-up device and each of the other two pick-up devices.

3. Apparatus as claimed in claim 1 wherein the reference gap is adjustable in effective length.

4. Apparatus as claimed in claim 1, wherein the control means includes means for reducing the speed of said relative rotation in response to an excited energising device reaching the reference gap, together with locking means for stopping the relative rotation on reaching the next of a plurality of predetermined stopping positions at which said locking means can set.

5. Apparatus as claimed in claim 1, including a further pick-up device effective over an arc in the reference gap and isolated from each of the first two pick-up devices by an arc greater than the effective arc of each energising device, the control means including means for reducing the speed of said relative rotation in response to an excited energising device reaching the reference gap and means for stopping the relative rotation in response to energization of the further pick-up device.

6. Apparatus as claimed in claim 1 wherein the pick-up devices are conductive segments and the energising devices are engaging brushes.

7. Apparatus as claimed in claim 1, wherein the energizing devices are lamps and the pick-up devices are photo-electric cells, the lamps and cells having shields defining the arcs over which they are individually effective.

8. Apparatus as claimed in claim 1 including a selection matrix for individually selecting and exciting a particular one of the energizing devices.

References Cited by the Examiner

UNITED STATES PATENTS 3,142,009  7/1964  Novak _____ 318—467 X

ORIS L. RADER, *Primary Examiner.*

JOHN F. COUCH, *Examiner.*

B. DOBECK, *Assistant Examiner.*